(12) United States Patent
Ascencio Ascencio

(10) Patent No.: US 12,000,102 B2
(45) Date of Patent: Jun. 4, 2024

(54) UNDERWATER MODULAR STRUCTURE, MODULE OF OR FOR SAID UNDERWATER MODULAR STRUCTURE AND METHOD OF CONSTRUCTING AN UNDERWATER MODULAR STRUCTURE

(71) Applicant: MARINE INNOVATIONS AND ENGINEERING B.V., Delft (NL)

(72) Inventor: Jaime Alejandro Ascencio Ascencio, Delft (NL)

(73) Assignee: MARINE INNOVATIONS AND ENGINEERING B.V., Delft (NL)

( * ) Notice: Subject to any disclaimer, the term of this patent is extended or adjusted under 35 U.S.C. 154(b) by 258 days.

(21) Appl. No.: 17/772,900

(22) PCT Filed: Nov. 4, 2020

(86) PCT No.: PCT/NL2020/050686
§ 371 (c)(1),
(2) Date: Apr. 28, 2022

(87) PCT Pub. No.: WO2021/091375
PCT Pub. Date: May 14, 2021

(65) Prior Publication Data
US 2022/0396925 A1   Dec. 15, 2022

(30) Foreign Application Priority Data
Nov. 4, 2019   (NL) ...................... 2024156

(51) Int. Cl.
*E02B 3/04*   (2006.01)
*A01K 61/73*   (2017.01)
*E02B 3/06*   (2006.01)

(52) U.S. Cl.
CPC ................ *E02B 3/06* (2013.01); *A01K 61/73* (2017.01); *E02B 3/046* (2013.01)

(58) Field of Classification Search
CPC .. E02D 3/04; E02D 3/046; E02D 3/06; A01K 61/70; A01K 61/77; A61L 61/73
See application file for complete search history.

(56) References Cited

U.S. PATENT DOCUMENTS 3,548,600 A * 12/1970 Stolk ........................ E02B 3/14
  405/30
3,896,624 A *  7/1975 Chang ..................... E02B 3/129
  405/29

(Continued)

FOREIGN PATENT DOCUMENTS

BG         110575 A    7/2011
JP      H09242044 A    9/1997

(Continued)

OTHER PUBLICATIONS

International Search Report and Written Opinion for PCT/NL2020/050686, mailed Feb. 4, 2021 (33 pages).

*Primary Examiner* — Benjamin F Fiorello
(74) *Attorney, Agent, or Firm* — KDW FIRM PLLC

(57) ABSTRACT

An underwater modular structure includes a plurality of modules, a connector that interlocks the modules and a labyrinth defined by contours of the modules. Each module includes a connector insertion opening to receive a connector therethrough. The connector is an elongate member arranged through a connector insertion opening of each module thereby interlocking the modules. The labyrinth can be defined by outer and/or inner contours of the modules. A module of or for an underwater modular structure A method includes sinking a plurality of modules to a seabed, each module includes a connector insertion opening, and interlocking the modules with a connector that is an elongate member, by arranging the connector through at least one connector insertion opening of each of the modules, to form a labyrinth defined by contours of the modules. Such method (Continued)

may further include filling at least part of the underwater modular structure with a filler.

15 Claims, 10 Drawing Sheets

(56) References Cited

U.S. PATENT DOCUMENTS

| | | | | |
|---|---|---|---|---|
| 5,664,387 | A * | 9/1997 | Bhatti | A63H 33/108 |
| | | | | 52/592.1 |
| 6,431,792 | B1 * | 8/2002 | Barnes | E02B 3/046 |
| | | | | 52/603 |
| 6,896,445 | B1 | 5/2005 | Engler | |
| 7,029,200 | B1 * | 4/2006 | Cravens | E02B 3/04 |
| | | | | 405/15 |
| 7,686,539 | B2 * | 3/2010 | Aristaghes | E02B 3/06 |
| | | | | 405/35 |
| 2003/0138296 | A1 | 7/2003 | O'Hare | |
| 2014/0314484 | A1 * | 10/2014 | Pierce, Jr. | E02B 3/023 |
| | | | | 405/31 |
| 2015/0152614 | A1 * | 6/2015 | Burt | B28B 7/00 |
| | | | | 405/23 |
| 2019/0127976 | A1 * | 5/2019 | Donnelly | A63H 33/107 |
| 2019/0283845 | A1 * | 9/2019 | Gudesen | B65D 90/023 |
| 2020/0149238 | A1 * | 5/2020 | Birbeck | E02B 3/06 |

FOREIGN PATENT DOCUMENTS

| | | |
|---|---|---|
| WO | 03002827 A1 | 1/2003 |
| WO | 2010082198 A2 | 7/2010 |
| WO | 2011016068 A1 | 2/2011 |
| WO | 2014068151 A1 | 5/2014 |

* cited by examiner

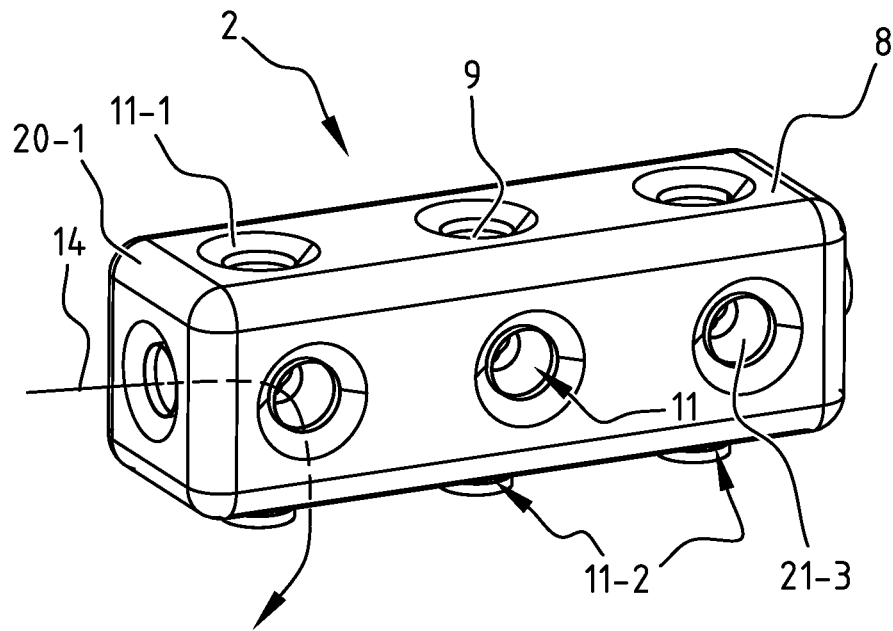
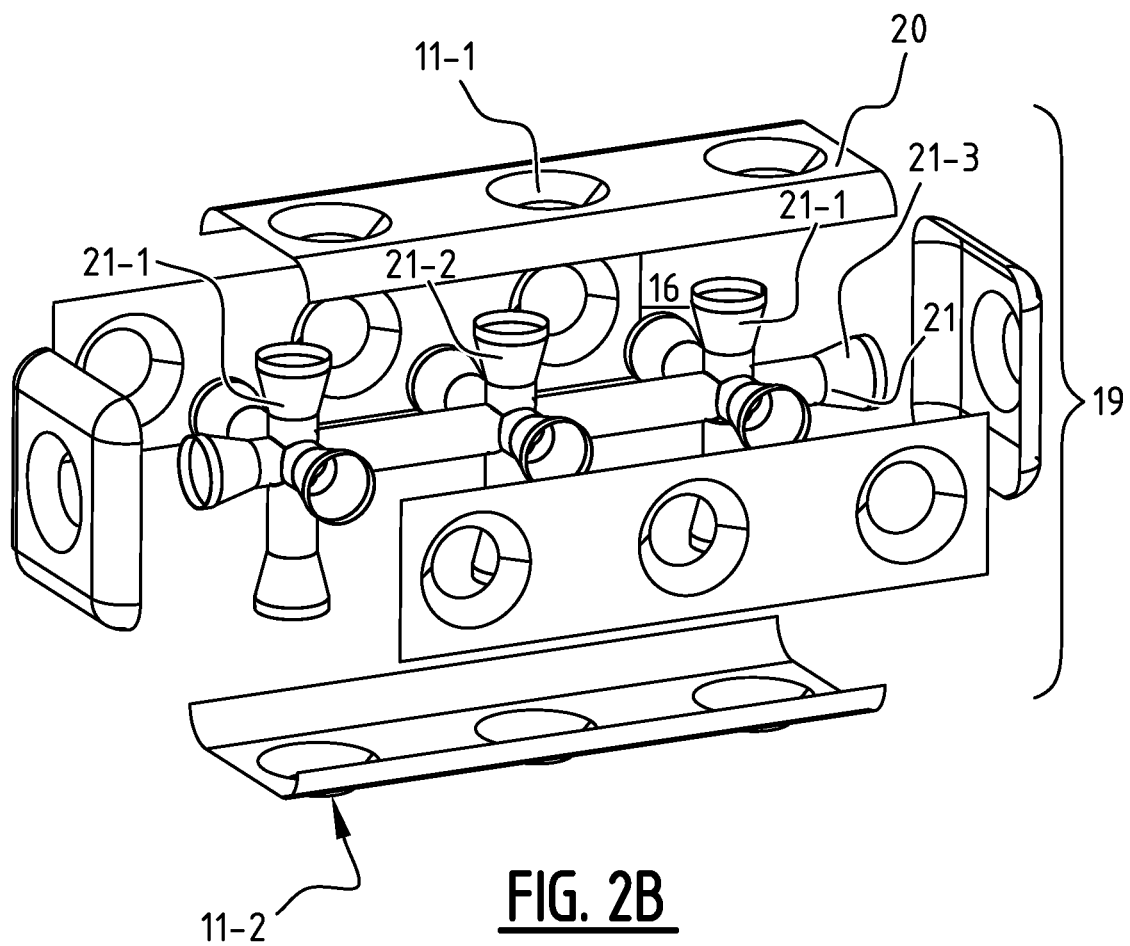
FIG. 2B

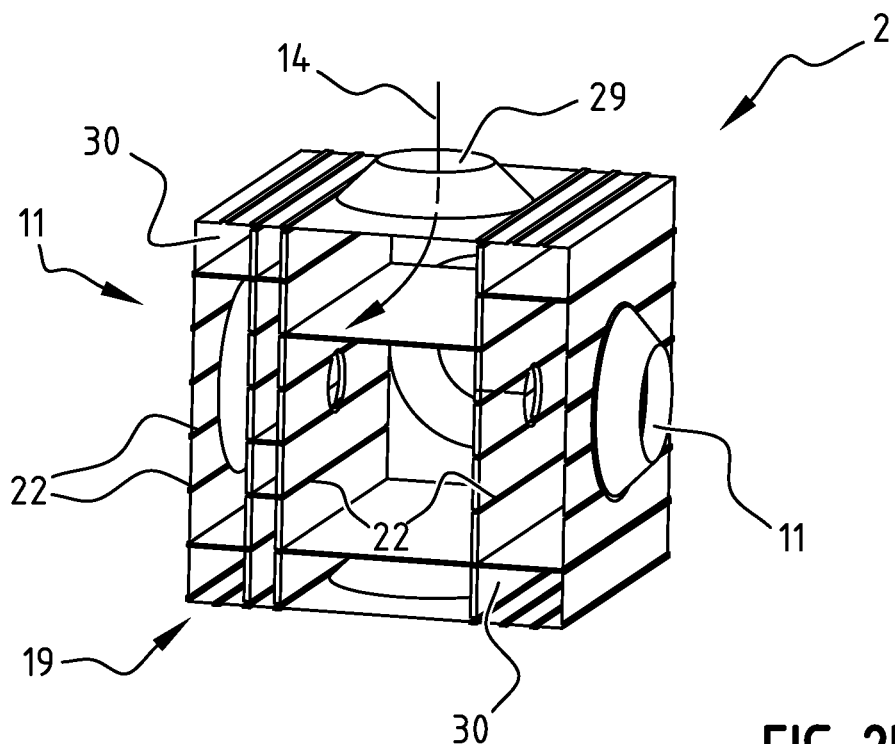
FIG. 2D
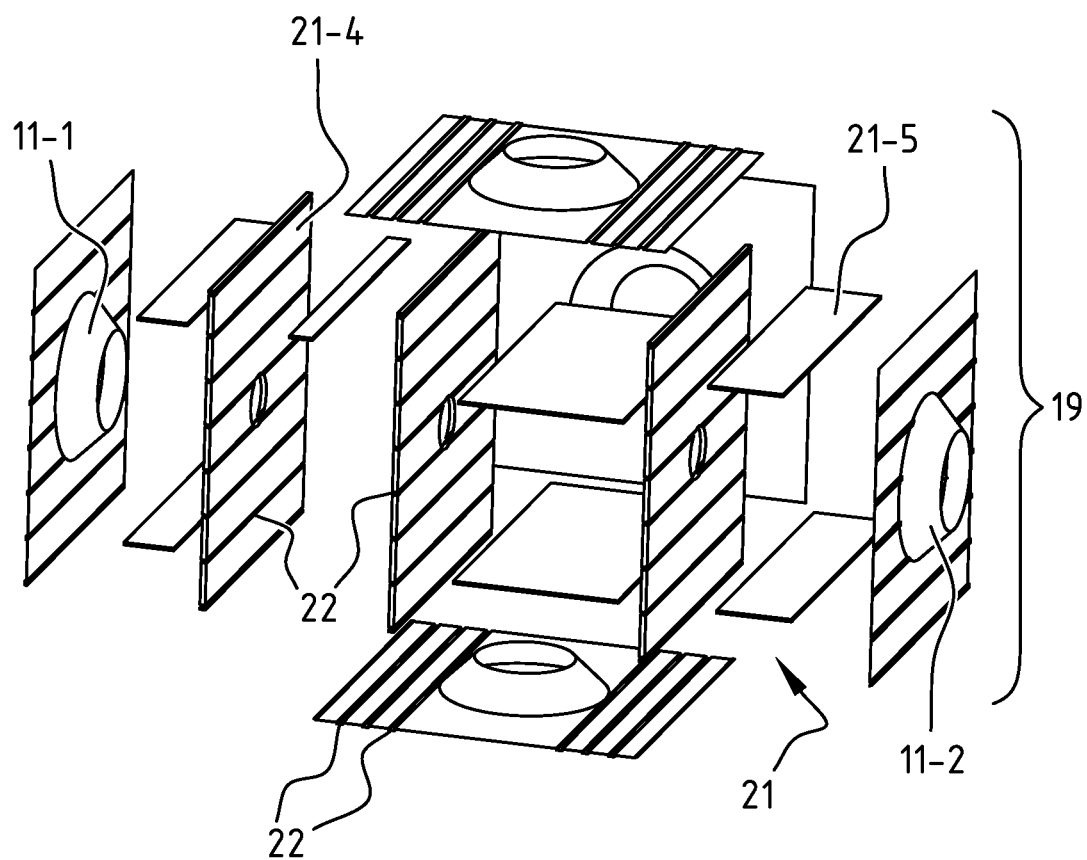

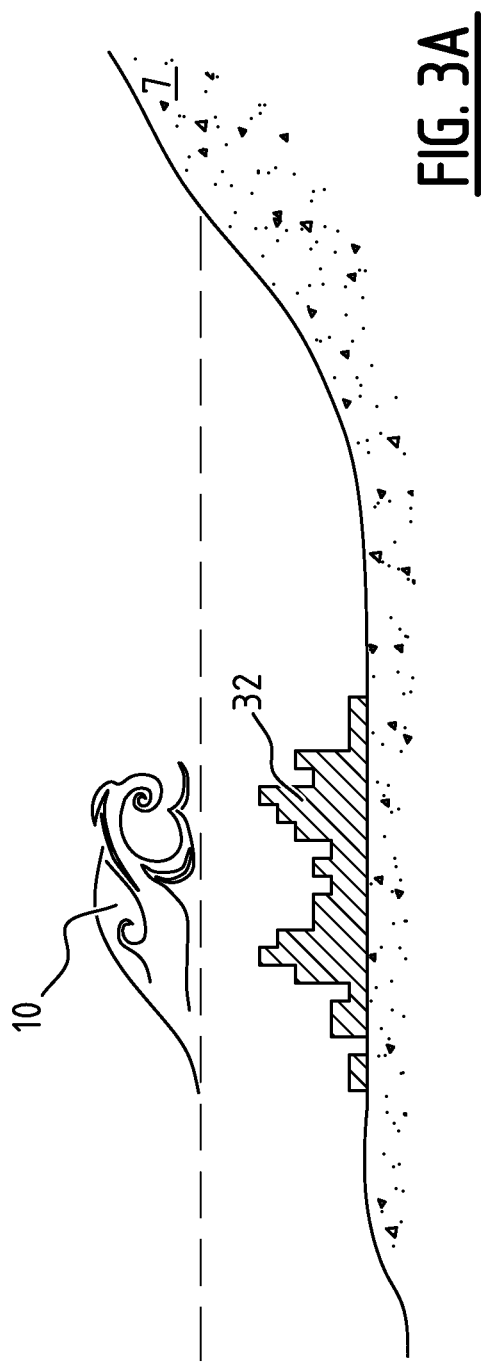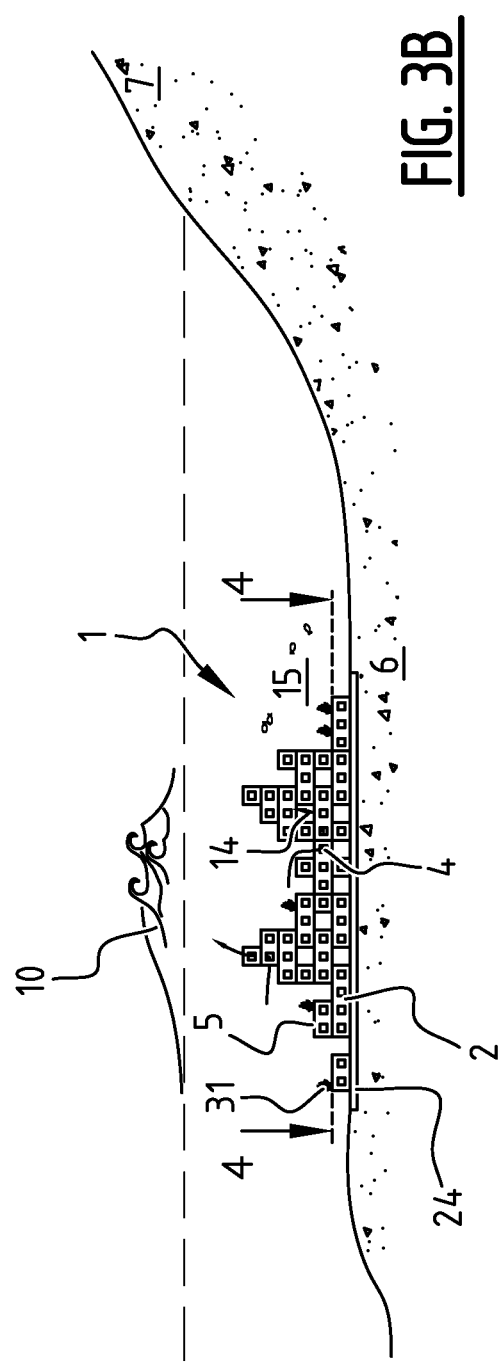

UNDERWATER MODULAR STRUCTURE, MODULE OF OR FOR SAID UNDERWATER MODULAR STRUCTURE AND METHOD OF CONSTRUCTING AN UNDERWATER MODULAR STRUCTURE

This application is a national stage filing under 35 U.S.C. 371 of International Application No. PCTNL2020/050686, filed Nov. 4, 2020, which claims priority to Netherlands Patent Application No. 2024156, filed Nov. 4, 2019, the entirety of which applications are incorporated by reference herein.

The invention relates to the technical field of underwater structures and methods of constructing underwater structures.

Various known underwater structures are used to protect coasts. Such underwater structures are generally constructed in the form of a dam, which may or may not extend above the surface of the water. In either case, when a wave of the water moves towards the dam, it is urged upwards and may pass over the dam in addition to being partially reflected off the dam. Said wave may reach and impact on a coast or structure beyond the underwater structure. This process encourages undesired alterations of the coast or structure such as erosion and deposition of sediments, deterioration of coastal protection installations such as dikes, floods of hinterland and/or disturbances of an underwater environment.

A purpose of the invention is to provide an underwater structure which is improved relative to the prior art and which abates incoming wave energy. Such underwater structure may thereby protect a coast beyond said underwater structure.

This is achieved by an underwater modular structure according to the invention, which underwater modular structure comprises a plurality of modules, at least one connector that interlocks the plurality of modules and a labyrinth defined by contours of at least the plurality of modules, wherein each module comprises at least one connector insertion opening configured to receive a connector therethrough and the at least one connector is an elongate member arranged through at least one connector insertion opening of each of the plurality of modules thereby interlocking the plurality of modules.

The purpose is also achieved by a method of constructing an underwater modular structure according to the invention, which method comprises the steps of sinking a plurality of modules to a seabed, wherein each module comprises at least one connector insertion opening, and interlocking the plurality of modules with at least one connector that is an elongate member, by arranging the at least one connector through at least one connector insertion opening of each of the plurality of modules, to form a labyrinth defined by contours of at least the plurality of modules.

The invention further relates to a module of or for an underwater modular structure as described in this application.

Advantageous embodiments of the invention are the subject of dependent claims and may also be learned from the following description and appended figures.

The underwater modular structure forces incoming water to pass through the labyrinth, thereby dissipating wave energy. Wave energy may be dissipated, for example due to turbulence and friction, as the wave is at least in part directed along and/or through the labyrinth. Dissipating wave energy has the effect of reducing wave impact beyond the underwater modular structure, for instance on a nearby coastline or structure. This reduces the erosion of said coastline or structure, especially when this involves sandy beaches. Furthermore, the upwards urge of the wave as it moves towards the underwater modular structure is reduced compared to conventional underwater structures, such as a dam.

The labyrinth is defined by contours of at least the plurality of modules and may be further defined by the at least one connector.

The term labyrinth in this context is employed to indicate a continuous space defined by contours of at least the plurality of modules. Such continuous space may be filled with water when the underwater modular structure is positioned underwater. The labyrinth may thus comprise paths along which the water may flow both through as well as past the contours of at least the plurality of modules. The labyrinth comprises said paths along which water may flow past the contours to the extent in which these contours affect the flowing past of water, for example through generating turbulence and friction. Further, such water flow favours water quality and nutrient distribution within the underwater modular structure 1, thus stimulating a local ecosystem.

The at least one connector that is an elongate member configured to interlock the plurality of modules may be of a substantially solid form, such as a pipe, rod, beam, hook, rail or plank, and/or of a substantially flexible form, such as a chain or cable. Preferably, the plurality of modules as well as the at least one connector are made of materials suitable for underwater use as known in the art, such as concrete, cement, durable plastics, copper, steel and stainless steel. The material for the plurality of modules need not be the same as that for the at least one connector. For example, modules may comprise concrete while the at least one connector may comprise stainless steel. Furthermore, the at least one connector may at least partly be incorporated in at least one of the plurality of modules.

The underwater modular structure may serve various ends, including coastal protection, protection of off-shore structures, coastal preservation, supporting an underwater ecological habitat and/or forming an artificial reef. These ends may be served by the underwater modular structure in combination or simultaneously. For example, the underwater modular structure may be formed as a breakwater to protect a coastline while also preserving a sandy beach from eroding and further forming a support structure for development of a reef ecosystem. In a further example, the underwater modular structure may form a barrier around an off-shore windfarm to reduce incoming waves and promote a reef habitat for local species. The underwater modular structure may also be advantageously employed around individual monopiles in order to reduce erosion or scour at a base of the monopile.

The invention is illustrated using the following figures, in which:

FIGS. 2A, 2B, 2C, 2D and 2E show schematic perspective overviews of modules of or for an underwater modular structure according to embodiments of the invention;

FIGS. 3A and 3B show schematic cross-sections of a conventional underwater structure and an underwater modular structure according to an embodiment of the invention, respectively, and their resulting dissipation of wave energy;

Figure 5:
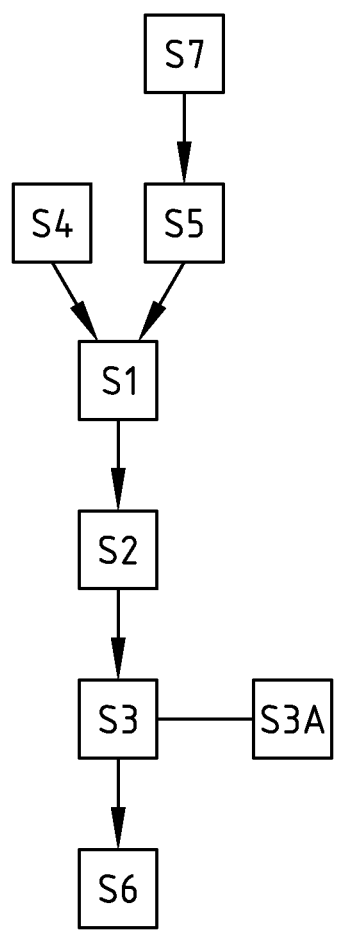
Figure 6:
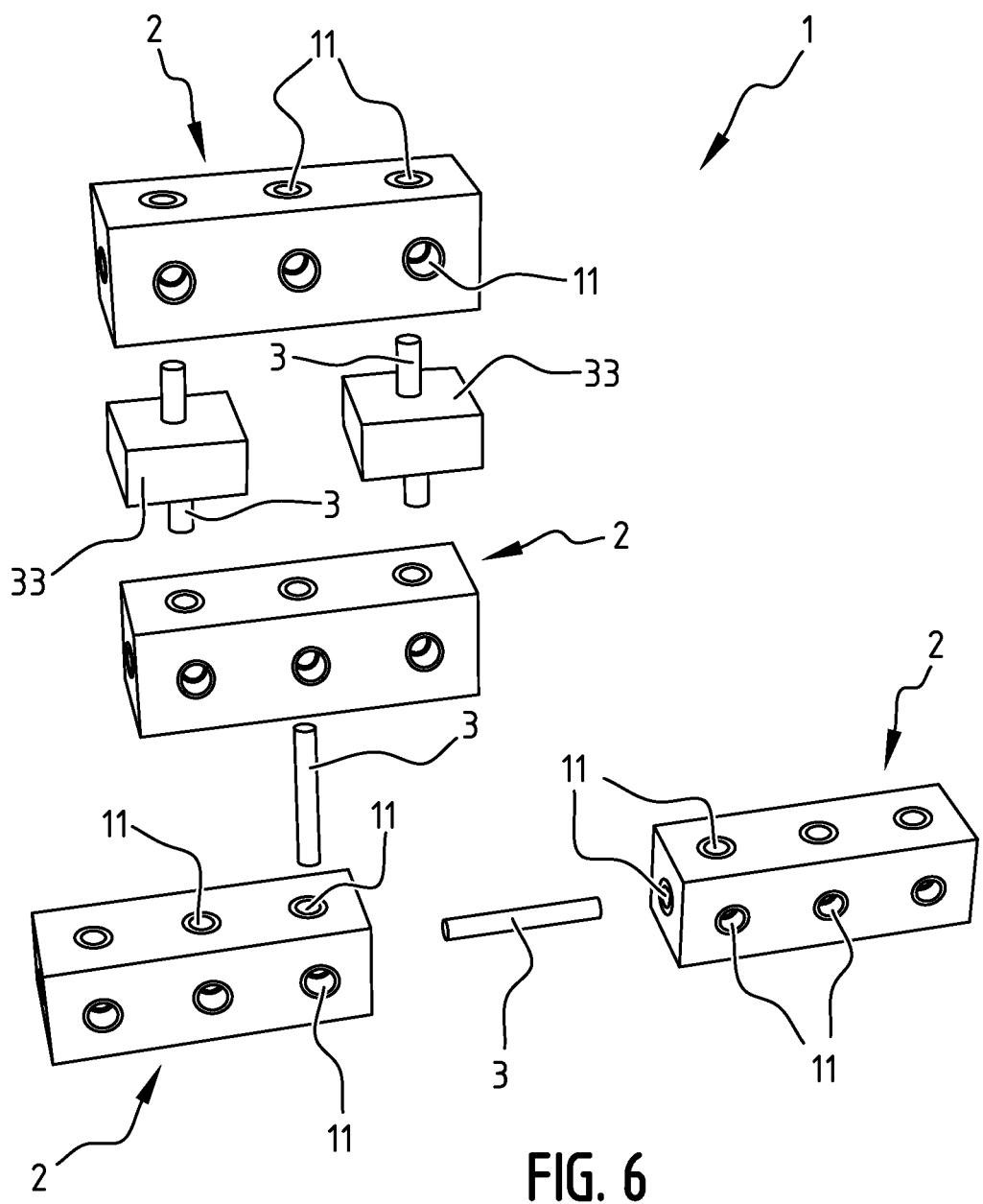

FIG. 5 diagrammatically shows steps of a method according to an embodiment of the invention; and FIG. 6 shows a schematic exploded view of an example of an underwater structure according to the invention.

The following reference numbers are used in the figures as well as in the accompanying description:

1 underwater modular structure,
2 module,
3 connector,
4 labyrinth,
5 contours,
6 seabed,
7 coast,
8 outer contour of module,
9 inner contour of module,
10 wave,
11 connector insertion opening,
11-1 inward taper or recess,
11-2 outward taper or protrusion,
12 outer contour of connector,
13 inner contour of connector,
14 tortuous path,
15 underwater ecological habitat,
16 chamber,
17 filler,
18 sediment,
19 module parts,
20 outer wall,
20-1 rounded edge,
21 inner wall,
21-1 inner wall defining module part of first type,
21-2 inner wall defining module part of second type,
21-3 tapered end,
21-4 first type panel,
21-5 second type panel,
22 slots,
23 outline,
24 anti-scour apron,
25 anchoring,
26 three-dimensional geometric complexity,
27 textured surface,
28 porous surface,
29 interconnected inlets and outlets,
30 cavity,
31 reef-forming species,
32 dam,
33 spacer.

Figure 1:
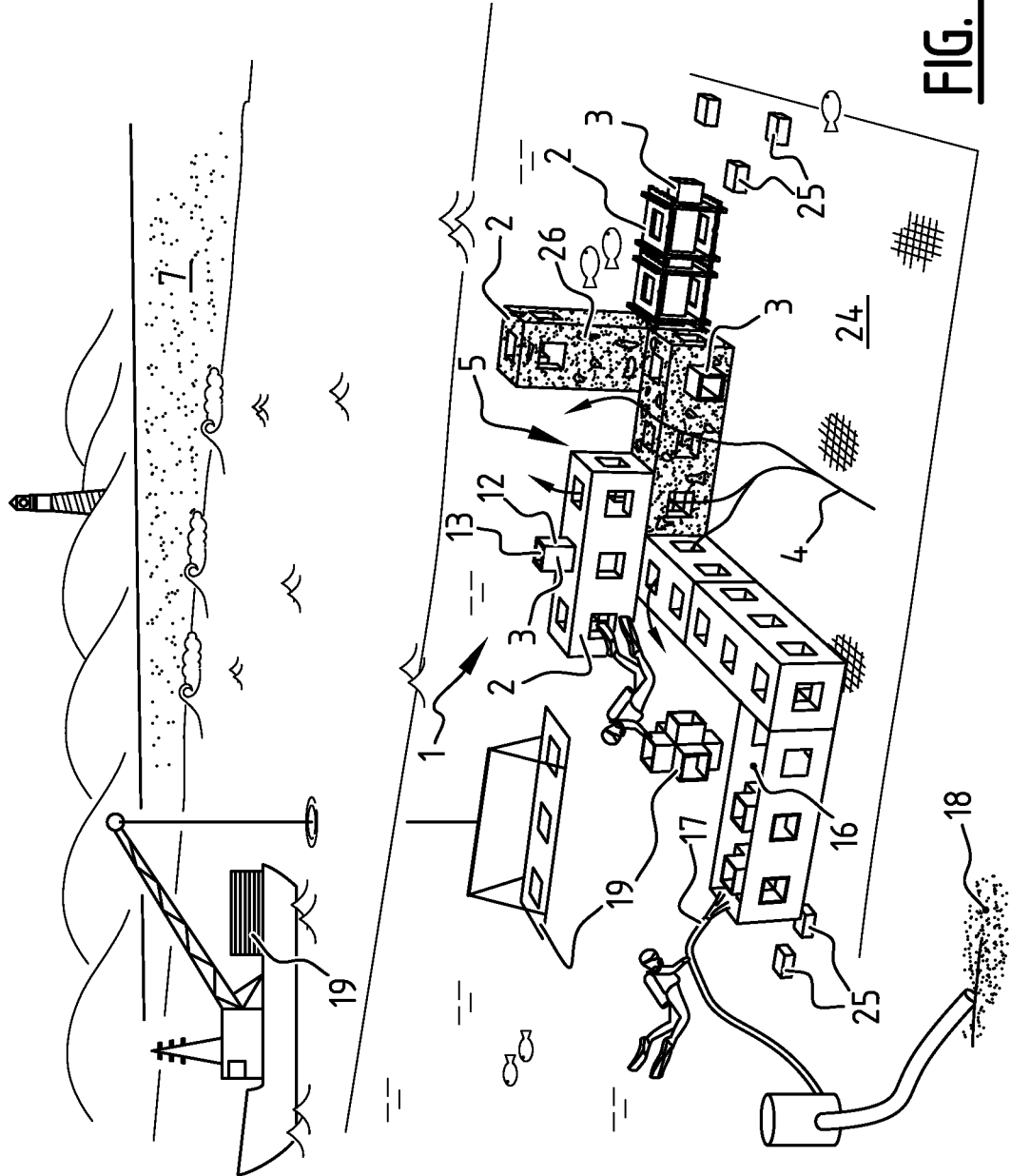
FIG. 1 shows a schematic perspective overview of an underwater modular structure according to an embodiment of the invention in construction.

In FIG. 1, an underwater modular structure 1 is shown while being constructed at an underwater construction site. The underwater structure 1 comprises a plurality of modules 2, at least one connector 3 that interlocks the plurality of modules 2 and a labyrinth 4 defined by contours 5 of at least the plurality of modules 2. The underwater modular structure 1 is shown as being constructed on a seabed 6 near a coast 7. Typical depths at which the underwater modular structure 1 may be constructed range from 2 to 10 m below sea surface.

The modular nature of the underwater modular structure 1 presents advantages, for example that the structure 1 is adaptable to local situations, that it is scalable and may be assembled on-site, even under water. Furthermore, local sediments 18 may be used in its construction, as illustrated in FIG. 1, which saves transportation efforts and limits introduction of potentially harmful elements to the underwater construction site.

Interlocking of the plurality of modules 2 by means of the at least one connector 3 ensures stability of the underwater modular structure 1. The at least one connector 3 may thus prevent movement and/or displacement of the underwater modular structure 1 and modules 2 thereof.

The labyrinth 4 of the underwater structure may at least in part be defined by outer contours 8 and/or inner contours 9 of the plurality of modules 2. The seabed 6 may also in part define the labyrinth 4. When a wave 10 approaches the underwater modular structure 1, it is forced to pass through and/or past the labyrinth 4 and thus at least some of the wave energy of wave 10 is dissipated. This is further explained in relation to FIG. 3 below.

The plurality of modules 2 may comprise at least one connector insertion opening 11. Additionally, the at least one connector 3 may interlock the plurality of modules 2 via the at least one connector insertion opening 11. Preferably, connector insertion openings 11 are provided in a sufficient number of the plurality of modules 2 so that the plurality of modules 2 are fully interlocked by means of the at least one connector 3 through the at least one connector insertion opening 11. This enhances stability of the underwater modular structure 1. More preferably, the connector insertion openings 11 are provided in each module 2 of the plurality of modules 2. This facilitates compatibility between the plurality of modules 2, enhances variability of the underwater modular structure 1 and reduces constructional effort at the underwater construction site.

The at least one connector 3 may be an elongate member. Preferably, the at least one connector 3 is a hollow member. The at least one connector 3 may thus be both elongate as well as hollow, though either elongate or hollow is also possible. For example, the at least one connector 3 may be a pipe with a perimeter of circular, rectangular or polygonal shape and may be a rail, hook or bar. When a connector 3 is designed as a hollow member, such connector 3 may be inserted into connector insertion openings 11 of modules 2 and thereby retain passage through these modules 2 when interlocking these modules 2 through their connector insertion openings 11.

Alternatively or additionally, the at least one connector 3 may comprise a mating recess and protrusion, preferably comprised with the plurality of modules 2. Upon engaging two of the plurality of modules 2, one comprising such recess and the other comprising such protrusion, the recess and protrusion may interlock. The mating recess and protrusion may be provided on each of the plurality of modules 2 to ensure mutual interlocking.

In an advantageous embodiment, the mating recess and protrusion are provided on outer contours 8 of modules 2 at the connector insertion openings 11. This facilitates alignment of the connector insertion openings 11 of the plurality of modules 2 when construction the underwater modular structure 1, especially when this is performed underwater with limited visibility. The at least one connector 3 may then be readily introduced through the connecter insertion openings 11, their alignment being assured through the mating recess and protrusion.

The labyrinth 4 may at least partly be defined by outer contours 12 and/or inner contours 13 of the at least one connector 3. For example, when the at least one connector 3 is the hollow member, it may contribute to the labyrinth 4 with its hollow interior. In other words, when the at least one connector 3 is hollow, it further defines the labyrinth 4.

At least one of the modules 2 may further comprise a tortuous path 14 further defining the labyrinth. The tortuous path 14 may be internal to the at least one of the modules 2. The tortuous path 14 adds complexity to the labyrinth 4, thus offering an increased number of possible paths for the wave 10 to pass through, thereby enhancing dissipation of wave energy of the wave 10.

Furthermore, the tortuous path 14 may be configured to allow passage of underwater life into and out of the underwater modular structure 1 and/or to offer shelter for underwater life. The underwater modular structure 1 may thus foster underwater life of or for an underwater ecological habitat 15, in contrast to conventional underwater structures that generally reduce or damage such underwater life and underwater ecological habitat 15.

The underwater modular structure 1 may further comprise at least one chamber 16 that is at least partly filled with a filler 17. The at least one chamber 16 may be comprised within individual modules 2 and/or connectors 3. Alternatively or additionally, the at least one chamber 16 may be comprised between the plurality of modules 2 or may be defined by the plurality of modules 2. Preferably, the at least one chamber 16 is comprised within at least one module 2 of the plurality of modules 1 of the underwater modular structure 1.

The filler 17 may be used to add mass to the underwater modular structure 1, so that it is not easily worn down, moved or displaced by movements of the water, such as arising from waves, tides and passing of ships. Known underwater structures are generally made from solid concrete to prevent such structure from being affected by movements of the water. Solid concrete structures require a large amount of raw materials and correspondingly large transportation and installation equipment resulting in large costs and high environmental impact.

Preferably, the filler 17 is a sediment 18. The sediment 18 may be taken from the seabed 6 on or near the underwater construction site at which the underwater modular structure 1 is built and/or positioned. This allows for easy provision of additional mass to sink and/or stabilise the underwater modular structure 1. Alternatively or additionally, the sediment 18 may be taken from dredging activities or other convenient sources. In this way, residual material may be repurposed.

Furthermore, the modules 2 and/or connectors 3 may be executed in a hollow or light-weight fashion, so that transportation and production effort may be reduced, thereby also reducing associated carbon emissions. For example, some of the modules 2 may each comprise the chamber 16 so that these modules 2 may be configured as substantially empty for transportation to the underwater construction site to be filled at the underwater construction site. This limits transportation and installation efforts for such modules 2 and thus also for the underwater modular structure 1 as a whole.

In FIG. 2A, FIG. 2B, FIG. 2C, FIG. 2D and FIG. 2E, embodiments of the module 2 are illustrated. Though these five embodiments are presented separately, features of these embodiments may be combined at least in ways that follow from the dependencies in the claims. It should in particular be noted that the plurality of modules 2 may comprise several types of modules 2 and that within each type different versions of modules 2 may be employed. For example, the embodiments of FIG. 2A and FIG. 2B may represent two versions of a first type of the module 2, while FIGS. 2C and 2D may represent two versions of a second type of the module 2 and FIG. 2E may represent a third type of module 2.

Figure 2A:
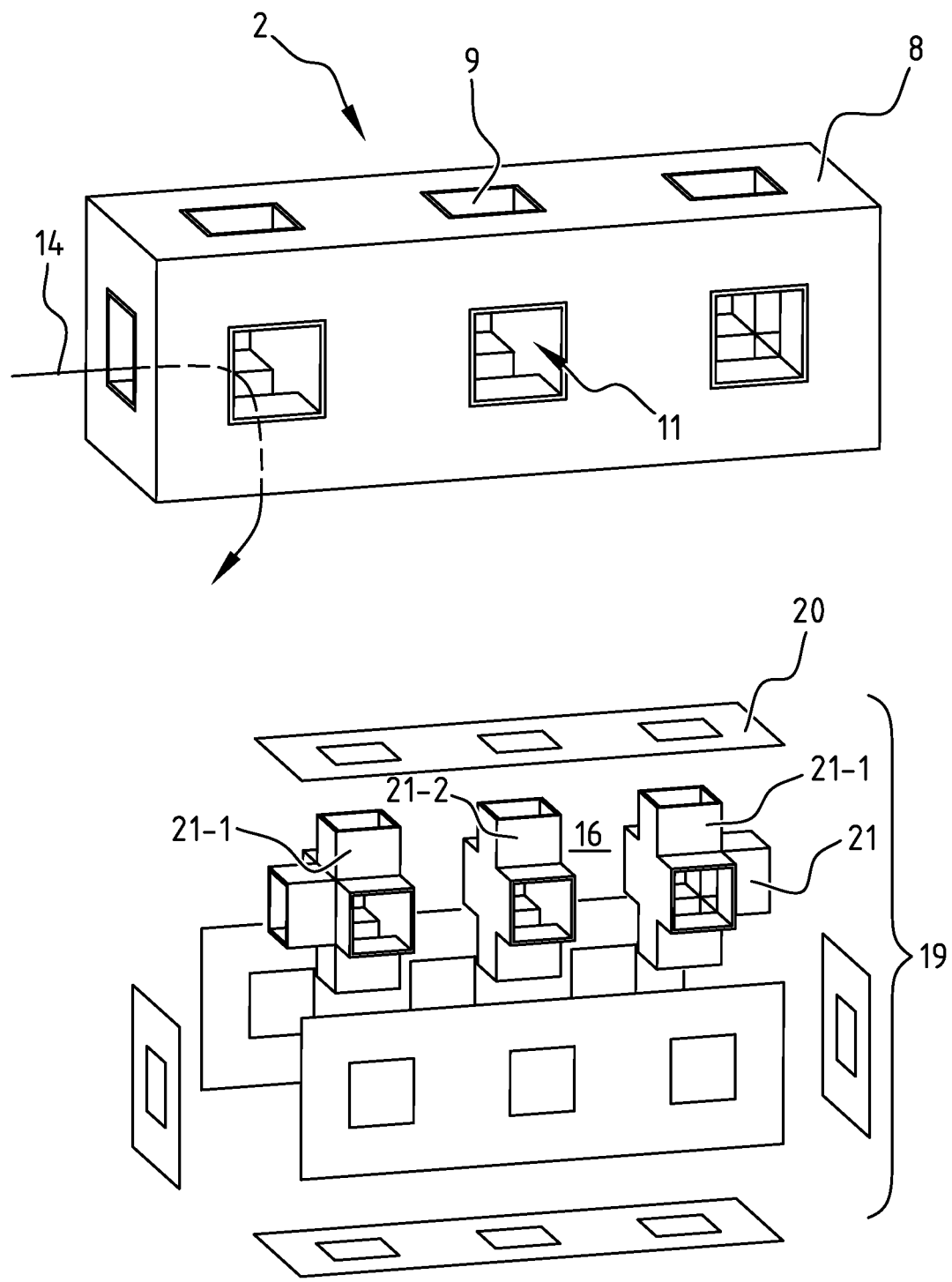

FIG. 2A illustrates an embodiment of a module 2 comprising module parts 19 that are configured for assembly into said module 2. An assembled view as well as an exploded view of said module 2 are shown at the top and bottom of FIG. 2A, respectively. At least one of the modules 2 of the underwater modular structure 1 may thus comprise module parts 19 that are configured for assembly into said at least one of the modules 2. The at least one of the modules 2 comprising a tortuous path 14 may be the same as or distinct from the at least one of the modules 2 comprising module parts 19.

The module parts 19 may be configured in various ways, examples of which are presented in FIG. 2A-2D. The module parts 19 may be configured for assembly into the module 2 by means of mating edges and/or known fastening elements.

Preferably, the module parts 19 define at least one of an outer wall 20 of said module 2 and an inner wall 21 of said module 2. The modular parts 19 that define the outer wall 20 of said module 2 may mutually engage, mate, interdigitate or couple to form the outer contour 8 of said module 2. The modular parts 19 that define the inner wall 21 of said module 2 may equally engage mutually to form the inner contour 9 of said module 2. Furthermore, the module parts 19 may mutually engage to form both the outer wall 20 as well as the inner wall 21 of said module 2. As shown in FIG. 2A, the outer wall 20 comprises the at least one connector insertion opening 11 of the module 2.

In the example of FIG. 2A, the module parts 19 are illustrated to define both the outer wall 20 as well as the inner wall 21 of the module 2 in its assembled state. Furthermore, the outer wall 20 may define the outer contour 8 and the inner wall 21 may define the inner contour 9 of such module 2. FIG. 2A shows three inner walls 21 defining module parts 19, two of a first type 21-1, having five orthogonal openings, and a second type 21-2, having four orthogonal openings. Alternatively, this example may be modified to contain only three inner wall 21 defining module parts 19, all of a third type having six orthogonal openings, said third type ensuring mutual interconnection along the longer axis of the illustrated module 2.

In an advantageous embodiment of the module 2, the chamber 16 may be formed by the module parts 19, for example between the outer wall 20 and the inner wall 21 of said module 2. One of the module parts 19 may be configured for closing the chamber 16 after the chamber 16 is filled with the filler 17, for example as illustrated in FIG. 1.

FIG. 2B illustrates another version of the module 2 of FIG. 2A, to which the foregoing description is also applicable. However, in contrast to the module 2 of FIG. 2A, the module 2 of FIG. 2B comprises rounded edges 20-1, here by way of non-limiting example comprised on the outer wall 20 of the module 2. The rounded edges 20-1 of the module 2 have three main advantages:

First, improved hydrodynamics by making it easier for water to flow past and through the structure, resulting in a lower drag force. A lower drag force results in an overall better stability of the underwater modular structure.

Second, the rounded edges 20-1 reduce sediment accumulation.

Third, once multiple modules 2 with rounded edges 20-1 are assembled in contact, their rounded edges 20-1 provide additional voids, contributing to the labyrinth 4 that dissipates wave energy and/or supporting development of an underwater ecological habitat 15.

Further, the module 2 of FIG. 2B has at least one connector insertion opening 11 that is tapered inwards, defining an inward taper or a recess 11-1. Such inwardly tapered or recessed connector insertion opening 11 advantageously defines a guide for inserting the connector 3 therein. The inward taper 11-1 is here illustrated as conical and surrounding the connector insertion opening 11. Though the taper 11-1 is preferably smooth, it may comprise abrupt or stepped changes in diameter. Further, the inward taper or recess 11-1 need not cover the full circumference of the connector insertion opening 11 but may be limited to parts of said circumference.

The module 2 as illustrated in FIG. 2B further comprises at least one connector insertion opening 11 that is protruding outwards, defining a outward taper or protrusion 11-2. Such outwardly tapered or protruding connector insertion opening 11 is preferably configured to correspond to the inward taper or recess 11-1, so that an outwardly protruding connector insertion opening 11 of one module 2 can be slotted into an inwardly tapered connector insertion opening 11 of another module 2. This facilitates alignment of modules 2. Thus, an outward taper or protrusion 11-2 may couple to an inward taper 11-1 on a similar module 2.

In other words, the outwardly and inwardly tapered connector insertion openings 11 are configured to mutually engage. Preferably, an inwardly tapered connector insertion opening 11 is arranged opposite an outwardly tapered connector insertion opening 11 on the same module, so that a guide is provided for arranging a connector 3 through said module 2. This facilitates assembly of the underwater modular structure 1.

Though FIG. 2B illustrates only outward tapers 11-1 on one side of the module 2 and only inward tapers 11-2 on the opposite side of the module 2, any side of the module 2 may comprise any one or both of inward and outward tapers 11-1, 11-2.

The inward tapers or recesses 11-1 form a guide for inserting the connectors 3. When also employing outward tapers or protrusions 11-2 on the plurality of module 2, alignment between modules 2 is further facilitated. When the inward and outward tapers 11-1, 11-2 are also arranged on opposite sides of the modules 2, a guide is formed for inserting a connector 3 through the modules 2. These arrangements are particularly advantageous when installing an underwater modular structure 1 below the water surface, where currents may act on the various components (modules 2 and/or their module parts 19 as well as the connector 3) while moving these into position.

For example, once a module 2 with at least one inwardly tapered connector insertion opening 11 is in position on the seabed 6, a connector 3 (being an elongate member) may be moved in approximate position and then be guided by the inward taper 11-1 into said connector insertion opening 11 and thus into said module 2. Instead of or preceding the connector 3, another module 2 with an inwardly tapered connector insertion opening 11 may be coupled to the module 2 with the inwardly tapered connector insertion opening 11. The coupled tapers 11-1, 11-2 may increase stability of the underwater modular structure 1, even during assembly thereof.

The inner wall 21 of module 2 of FIG. 2B forms internal tubing with tapered ends 21-3 for connection to the outer wall 20. In particular, the tapered ends 21-3 of the inner wall 21 are configured to engage inwardly or outwardly tapered connector insertion openings 11 in the outer wall 20. In the illustrated example, the inner wall 21 comprises circular tubing with conical ends configured to couple to conical edges of circular connector insertion openings. This configuration allows simplified underwater assembly of the module 2 from module parts 19. Other shapes are also envisaged, including square (for example as in FIG. 2A), rectangular or oval.

Figure 2C:
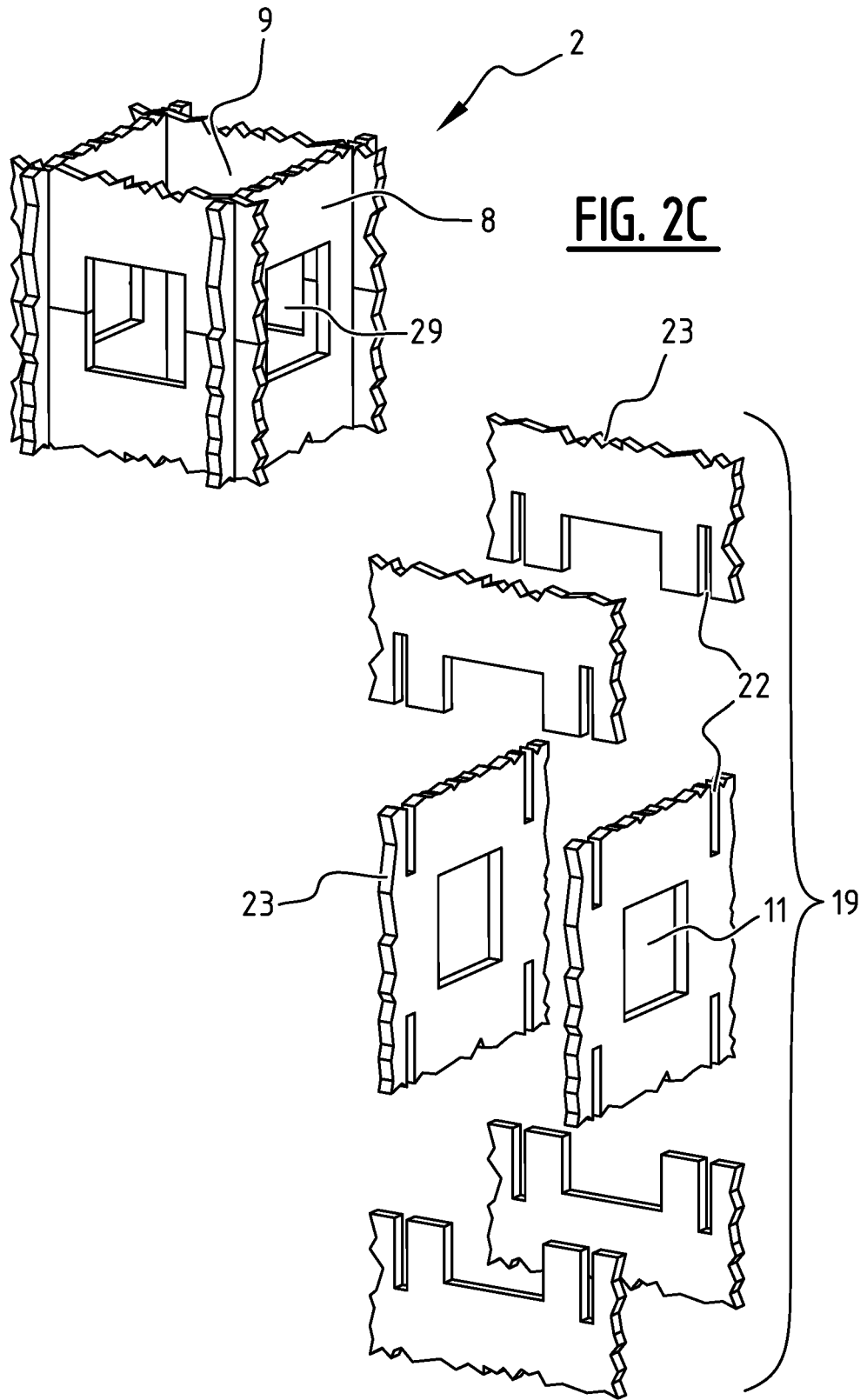
Figure 2E:
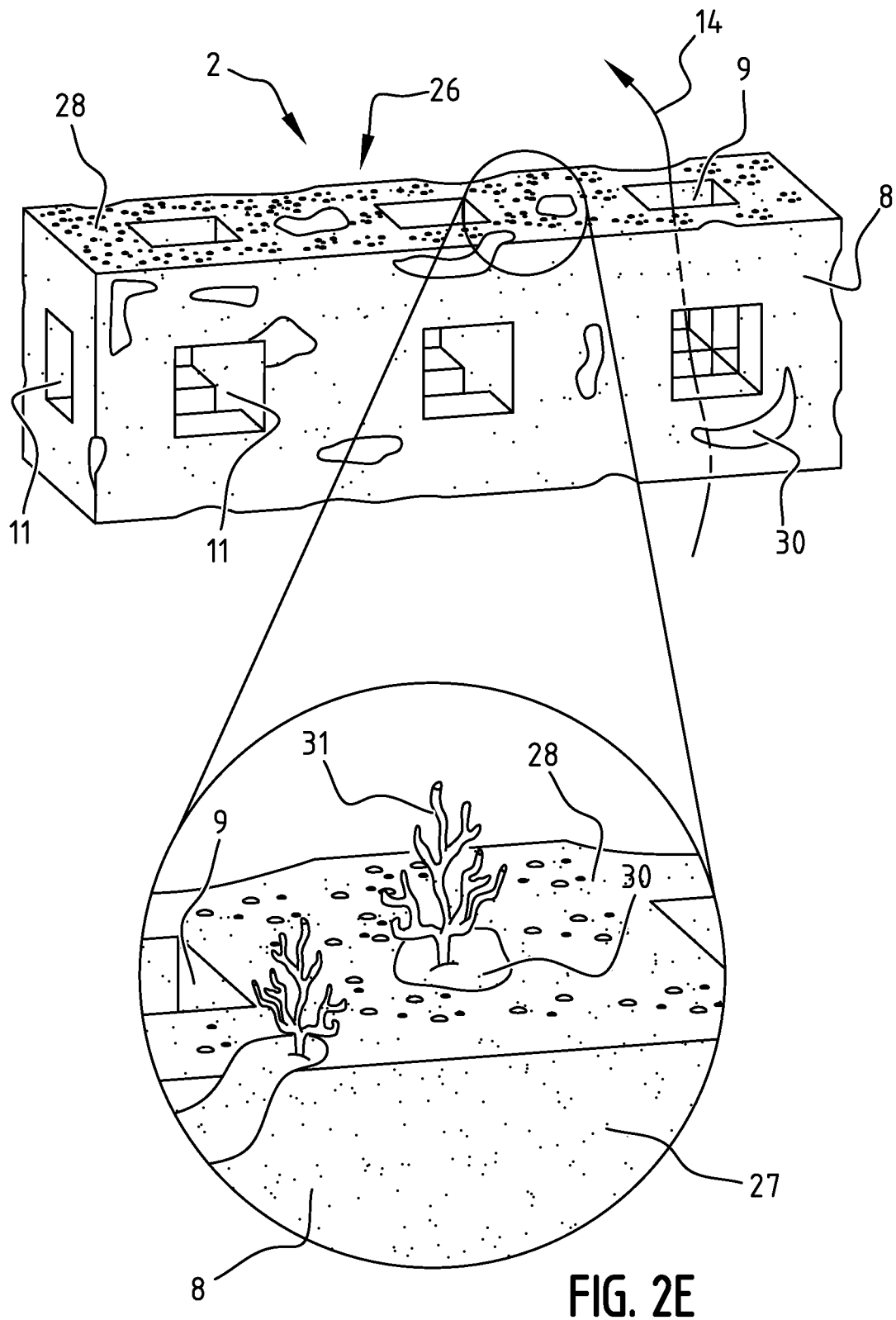

Preferably, at least the outer wall 20 of the modules 2 of FIGS. 2A and/or 2B comprise a textured surface 27, further explained in relation to FIG. 2E.

The examples of FIGS. 2A and 2B show modules 2 with a dimension ratio of width:height:length equal to 1:1:3. Other ratios may be employed, such as 1:1:1 (cubic form), 1:1:2, 1:2:2 and 1:1:4. Preferably, a connector insertion opening 11 is arranged at each end of the module 2 and/or equidistant along its sides. Preferable sizes of an elongate module 2 are 1 m width, 1 m height and 3 m length.

An elongate form is preferred so that overhangs, bridges, tunnels and the like can be achieved in the labyrinth 4 of the underwater modular structure 1. Further, the underwater structure 1 is made to be adaptable, scalable and versatile even when only one type of elongate module 2 is used. Incoming waves may be better dissipated and passage of larger species, such as predatory fish, through the underwater modular structure 1 is made possible while providing necessary structural stability even to increased heights compared to existing artificial reefs.

In general, the underwater modular structure 1 according to the invention may comprise at least one connector insertion opening 11 that is inwardly tapered to define a guide for connector insertion into said module 2. That is, one or more of the at least connector insertion opening 11 of the underwater modular structure 1 may be inwardly tapered. The at least one inwardly tapered connector insertion opening 11 facilitates insertion of a connector 3 therein, and thus into and possibly through the module 2 which comprises said inwardly tapered connector insertion opening 11.

Additionally or alternatively, the underwater modular structure 1 according to the invention may comprise at least one connector insertion opening 11 that is outwardly protruding. That is, one or more of the at least connector insertion opening 11 of the underwater modular structure 1 may be outwardly tapered. The at least one inwardly tapered connector insertion opening 11 facilitates insertion of a connector 3 therein, and thus into and possibly through the module 2 which comprises said inwardly tapered connector insertion opening 11.

Preferably, the inwardly tapered connector insertion opening 11 and the outwardly protruding connector insertion opening 11 are arranged on opposite sides of the same module 2 to mutually extend the guide defined by the inwardly protruding connector insertion opening 11 to guide the connector out of said module 2. When multiple modules 2 are configured in this way, the inwardly and outwardly tapered connector insertion openings 11 of different modules can aid mutual alignment of the multiple modules 2. Following alignment, a connector 3 may be inserted through the aligned module 2, thus facilitating construction, especially under water.

FIG. 2C illustrates another embodiment of a module 2 which comprises module parts 19 that are configured for assembly into said module 2. An assembled view as well as an exploded view of said module 2 are shown in FIG. 2C. Here, the module parts 19 comprise slots 22 configured for mutual engagement. The module parts 19 with the slots 22 mutually engage or interdigitate to form said module 2. Such module parts 19 may advantageously be formed in a board-like shape with slots cut into sides of the board-like shape. Additionally or alternatively, such module parts 19 may comprise an outline 23. The outline 23 may be configured to fall within the outer contour 9 of other modules 2 so that, for example, the various illustrated embodiments of modules 2 are mutually compatible.

As illustrated in FIG. 2C, upon assembly of the module 2 comprising of module parts 19 with slots 22, said module 2 may comprise connector insertion openings 11. The slots 22 of the module parts 19 are spaced apart to obtain appropriate dimensions for the connector insertion opening 11.

Though FIG. 2C shows six module parts 19, this is an example only and other numbers of module parts 19 with slots 22 may be employed. For example, the slots 22 may be configured with twice the number of modules parts 19 shown in FIG. 2C while decreasing mutual spacing between the module parts 19 within the module 2, thereby creating smaller openings, paths and/or channels through said module 2 adding to the labyrinth 4. The slots 22 may thus be configured in different arrangements that create openings of different sizes, further dissipating wave energy. Such openings have the effect of reducing drag forces, thus increasing stability of the underwater modular structure 1. In addition or as an alternative, such arrangements which may be optimised for fish and other marine species to shelter and thereby foster the underwater ecological habitat 15.

FIG. 2D illustrates another embodiment of a module 2, which also comprised module parts 19 with slots 22 for mutual engagement of the module parts 19. A connector 3 is also shown passing through connector insertion openings 11 of the module 2. The example illustrated in FIG. 2D shows a module 2 having multiple inner walls 21 in the form of horizontal and vertical panels that are coupled via slots 22. The placement of the panels may be variable, as illustrated, by selecting particular slots 22 so that the internal structure of the module 2 is adaptable, for example, with respect to the location and function of the module 2 in the underwater modular structure 1. The inner walls 21 are configurable to create cavities 30 of variable dimensions in order to provide a suitable habitat for marine life and to further define the labyrinth 4 to dissipate wave energy. Further, the inner walls 21 may be provided with openings or cavities 30, for example according to specific target species.

The inner walls 21 may comprise first type panels 21-4, that are configured to couple to the outer walls 20 of the module 2, and second type panels 21-5, that are configured to couple to the first type panels 21-4, preferably by means of the slots 22. Such arrangement increases ease of assembly under water and provides flexibility to create cavities 30 and tunnels (interconnected inlets and outlets 29 and/or tortuous paths 14) of different sizes, for example to provide shelter for juvenile fish. The module 2 is shown with two connector insertion openings 11 through which an elongate connector 3, here illustrated in the form of a hollow tube, can be arranged. For this purpose, the first type panels 21-4 also comprise connector insertion openings 11. Inward tapers 11-1 and outward tapers 11-2 are also illustrated on the outer wall 20 of the module 2 around its connector insertion openings 11.

The various modules 2 disclosed here are preferably configured as mutually compatible. For example, the various modules 2 may be used with the same connectors 3, be placed substantially flush against each other and/or support each other. Furthermore, the various modules 2 may be provided in dimensions such that these are mutually compatible. For example, the modules 2 illustrated in FIGS. 2A, 2B and 2E delineate three times the volume of the module 2 illustrated in FIGS. 2C and 2D, facilitating mutual stacking, interlocking and/or positioning of these modules 2. This compatibility is also illustrated in FIG. 1.

Any embodiment of the underwater modular structure 1 may further comprise an anti-scour apron 24. The anti-scour apron 24 may be formed from, for example, sheet material and/or a cellular confinement system. The anti-scour apron 24 may comprise an anchoring 25 fixed into the seabed 6. The anchoring 25 may be configured to connect to at least one of the plurality of modules 2. Alternatively or additionally, the anchoring 25 may be comprised within the underwater modular structure 1 without the anti-scour apron 24 being present. The anchoring 25 need not be connected to the anti-scour apron 24. In any case, as the plurality of modules 2 are also interlocked by means of the connectors 3, the whole of the underwater modular structure 1 may thus be fixed to the seabed 6. Preferably, multiple anchorings 25 are employed to strongly fix the underwater modular structure 1 to the seabed 6.

The anti-scour apron 24 may serve two main purposes. First, stabilize surrounding sediments and protect the structure from scour, this is particularly relevant with a sandy seabed 6 where erosion of sediment can cause the underwater modular structure 1 to lose stability and fail. Second, the anti-scour apron 24 may be pre-seeded with vegetation such as seagrass or benthic species that contribute to dissipation of wave energy and to the underwater ecological habitat 15 while also stabilizing the seabed 6.

FIG. 2E illustrates yet another embodiment of a module 2. Here, at least one of the modules 2 comprises a three-dimensional geometric complexity 26 that further defines the labyrinth 4. The three-dimensional geometric complexity 26 may equally be combined with any other variant of the modules 2, such as the examples presented in FIG. 2A-2D.

The three-dimensional geometric complexity 26 may be configured to stimulate development of the underwater ecological habitat 15. The underwater ecological habitat 15, such as a reef, adds to the three-dimensional geometric complexity 26 which may already be comprised in some of the modules 2 and thus further enhances dissipation of wave energy.

Additionally, the three-dimensional geometric complexity 26 may comprise at least one of a textured surface 27, a porous surface 28, a plurality of interconnected inlets and outlets 29 and a cavity 30. The porous surface 28 is preferably configured to be colonised by underwater organisms, thereby promoting additional geometric complexity that dissipates wave energy and/or development of the underwater ecological habitat 15. For example, the porous surface 28 may promote growth of micro-organisms, mollusca and/or anthozoa that produce nutrients for other marine species of the underwater ecological habitat 15. The three-dimensional geometric complexity 26 may vary between modules 2 and may even vary on a single module 2. For example, the module 2 illustrated in FIG. 2E contains the textured surface 27 on most of its faces, while another face contains the porous surface 28 and cavities 30 are dispersed over all its face. The plurality of interconnected inlets and outlets 29 in the example of FIG. 2E comprise the connector insertion openings 11. Another example of the plurality of interconnected inlets and outlets 29 is illustrated in FIG. 2C. Variation within the plurality of modules 2 and their three-dimensional geometric complexity 26 allows optimization of the dissipation of wave energy and/or of the underwater ecological habitat 15 fostered by the underwater modular structure 1. The invention thus presents a versatile solution that may be implemented in various circumstances.

The textured surface 27 may be employed with any of the modules 2 illustrated in FIG. 2A-2E to promote reef forming organism to establish and thrive on the modules 2. The textured surface 27 may be produced by abrasion, deposition, casting or other known methods. Particularly advantageous is a method of applying a bias voltage on the module 2, for example its outer wall 20 comprising a metallic material, to accumulate calcium carbonate deposited from the water onto the module 2 in order accumulate surface texturing that is compatible with the marine environment and fosters the underwater ecological habitat 15.

The plurality of interconnected inlets and outlets 29 may differ from the tortuous path 14 or may at least partly comprise or be at least partly comprised by the tortuous path 14.

The underwater modular structure 1 may be seeded with reef-forming species 31 to promote development of an underwater ecological habitat 15. The reef-forming species 31 may include anthozoa, such as soft and stony corals, and/or mollusca, such as oysters. The reef-forming species 31 may encourage growth of a reef as the underwater ecological habitat 15, which aids in texturizing contours 5 defining the labyrinth 4. The reef-forming species 31 thus in particular stimulate the growth of a reef on the underwater modular structure 1, which adds a layer of complexity to it and aids in further reducing wave energy.

The seeding of the reef-forming species 31 may be arranged on any surface of the underwater modular structure, for example on the contours 5, on outer contours 8 and/or inner contours 9 of the modules 2 and/or on outer contours 12 and/or inner contours 13 of the at least one connector 3. Preferably, the reef-forming species 31 are seeded in specifically prepared cavities on surfaces of the underwater modular structure 1 such as may be comprised with the three-dimensional geometric complexity 26.

The invention may thus also result in a preservation of nature and encouragement of development of the underwater ecological habitat 15 rather than destroying one as is generally the case with conventional underwater structures.

The reef-forming species 31 may be selected based on environmental circumstances at the underwater construction site. This may promote growth of the underwater ecological habitat 15, in particular a reef habitat, within a reduced period of time.

In FIG. 3A, a cross-section of a conventional underwater structure is illustrated near a coast 7 with an incoming wave 10. The conventional underwater structure comprises a dam 32. As the wave 10 approaches this dam 32, the wave 10 results in an upward surge of water along and over the dam 32 which enlarges the wave 10, measured from sea level, as it passes over the dam 32 and approaches the coast 7. In this case, the wave energy is redirected. The wave 10 continues to propagate past the dam 32 with high wave energy which has an impact on the coast 7.

In contrast to this, FIG. 3B illustrates a cross-section of an underwater modular structure 1 according to the invention near the same coast 7 with the same incoming wave 10. The underwater modular structure 1 comprises a labyrinth 4 through which the wave 10 is forced, in part by its own wave energy. This reduces the upward surge of water along and over the underwater modular structure 1 compared to the dam 32. Yet, the underwater modular structure 1 retains its structural stability due to the interlocking of the plurality of modules 2 by the at least one connector 3. With the invention, the wave energy of the wave 10 is effectively dissipated and only a small amount of this wave energy approaches the coast 7. This may reduce coastal erosion and achieve other effects described in this application. For example, the invented underwater modular structure 1 causes lowered wave reflection, thus reducing wave energy and height at the incoming side (usually the off-shore side). This reduces erosion of the seabed 6, thus increasing stability of the underwater modular structure 1 compared to conventional less permeable structures or dams. Further, as the underwater modular structure 1 allows water circulation, an improved water quality can be achieved which supports development of the underwater ecological habitat 15.

The underwater modular structure 1 of the invention may dissipate wave energy by depth wave breaking as well as by friction-turbulence. Depth wave breaking is induced because the underwater modular structure 1 makes the water shallower, causing instability to the incoming wave 10, making it fall and break. Friction-turbulence is induced by the underwater modular structure 1 because of its labyrinth 4, which creates turbulence in the incoming wave 10 which through friction dissipates wave energy.

According to the invention, a vast underwater modular structure 1 may be assembled to provide an underwater structure that mimics natural coral reef, which may dissipate up to 97% of the wave energy, contrary to smaller underwater structures according to the prior art. The invention may provide such underwater modular structure 1 as an artificial reef that is stable with respect to incoming waves 10 and promotes development of an underwater ecological habitat 15.

Figure 4:
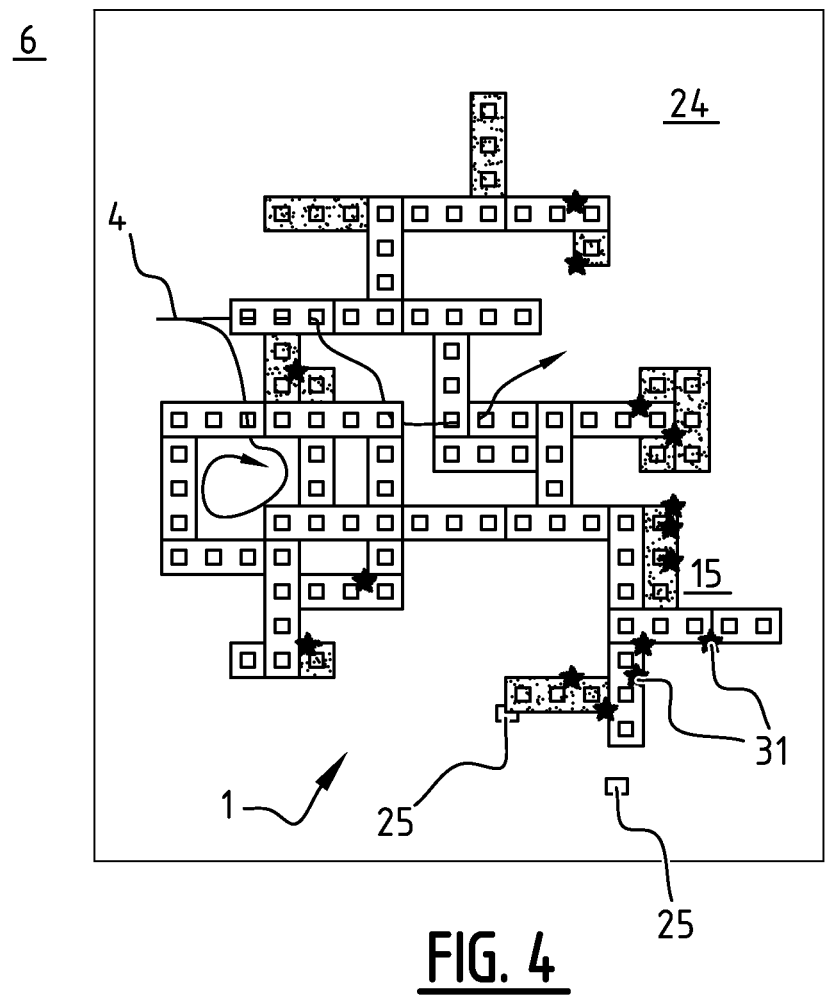
FIG. 4 shows a plan view of a cross-section of the underwater modular structure of FIG. 3B along the line IV-IV.

In FIG. 4, a plan view is shown of the underwater modular structure 1 of FIG. 3B in cross-section along the line IV-IV. This view illustrates a possible arrangement of the plurality of modules 2 for the underwater modular structure 2. Here, the plurality of modules 2 is interlocked and leaves open areas where modules 2 are absent. This arrangement partially forms the contours 5 that define the labyrinth 4. The wave 10 may flow through the labyrinth 4 and thereby wave energy is dissipated. The illustrated underwater modular structure 1 is further configured to foster an underwater ecological habitat 15 due to its wave dissipation and/or its labyrinth 4. Furthermore, the underwater modular structure 1 according to the invention may work equally well for the wave 10 incident from either side. That is, for incoming waves and waves reflected back from the coast 7 that lies beyond the underwater modular structure 1.

The labyrinth 4 may be defined by any of the features disclosed here and in any combination. In particular, the labyrinth 4 may be defined by one or more than one of:
- contours 5 of at least the plurality of modules 2;
- outer contours 8 and/or inner contours 9 of the plurality of modules 2;
- outer contours 12 and/or inner contours 13 of the at least one connector 3;
- a tortuous path 14 of at least one of the modules 2;
- a three-dimensional geometric complexity 26 of at least one of the modules 2; and/or
- an underwater ecological habitat 15 in or on the underwater modular structure 1.

Any combination of the above features is possible with the invention. The underwater modular structure 1 of the invention thus has an intrinsic versatility in the design of the labyrinth 4 which may be adapted to circumstances at the underwater construction site. The underwater modular structure 1 may also be dismantled and/or adapted as said circumstances change over time.

In FIGS. 1, 2A-2E, 3B and 4, several embodiments of modules 2 of or for an underwater modular structure 1 according to the invention are shown. Features described for each of these modules 2 may be combined in any way to form further embodiments of modules 2 of or for an underwater modular structure 1 according to the invention. For example, the plurality of modules 2 may comprise modules 2 including the tortuous path 14, the module parts 19 with slots 22, the chamber 16 and be seeded with reef-forming species 31 and other modules 2 including the three-dimensional complexity 26 with cavities 30 and connector insertion openings 11 with all modules compatibly dimensioned.

In FIG. 5, a method according to an embodiment of the invention is shown. This embodiment comprises the step S1 of sinking the plurality of modules 2 to the seabed 6 and the step S2 of interlocking the plurality of modules 2 with the at least one connector 3 to form the labyrinth 4 defined by contours 5 of at least the plurality of modules 2. Though it is preferred that step S2 follows step S1, as illustrated in FIG. 5, the order may be inverted so that step S1 follows step S2. Furthermore, these steps may be taken simultaneously or partly simultaneously. For example, while step S1 is performed and yet to be completed, the step S2 may be commenced in that a part of the plurality of modules 2 may be interlocked before being sunk to the seabed 6 and/or may be interlocked at the seabed 6 before all of the plurality of modules 2 have been sunk to the seabed 6.

Preferably, the method further comprises the step S3 of filling at least part of the underwater modular structure 1 with the filler 17. Step S3 may be performed after the steps S1 and S2 are completed, before any of the steps S1 and S2 are commenced or at least partly simultaneously with either or both of the steps S1 and S2. In FIG. 5, step S3 is illustrated after performing step S2, which has the advantage that the filler 17 is yet absent from the underwater structure and therefore may not interfere with interlocking the plurality of modules 2 with the at least one connector 3. An alternative is illustrated in FIG. 1, where one of the plurality of modules 2 is being filled while the underwater modular structure 1 is being constructed, i.e. steps S1 and S2 are ongoing.

More preferably, the step S3 further comprises the step S3A of pumping the sediment 18 from the seabed 6 into the underwater modular structure 1. The use of the sediment 18 from the seabed 6 to fill the modules 2 has several advantages, including that the method need not comprise transporting, sinking or producing filler 17 at or to the construction site. This saves times and effort, especially when compared to pre-filled modules 2 or solid construction elements that are conventionally made of concrete. Alternatively, the sediment 18 can be obtained from a shore, preferably nearby the underwater construction site, for example by pumping. Such sediment 18 may be locally available on said shore or may be imported material.

As illustrated in FIG. 1, the sediment 18 may be pumped from the seabed 6 into a partially assembled module 2, preferably into the chamber 16 of said module 2, by means of a pump, such as a submergible pump or a pump on a ship.

Preferably, the method further comprises the step S4 of assembling at least one of the modules 2 from module parts 19. This has the advantage that merely the module parts 19, which are preferably prefabricated, rather than whole modules 2 need transportation to the underwater construction site. Step S4 may be performed before S1, as illustrated in FIG. 5, though this order is not restrictive. For instance, S4 may be performed after S1. In other words, the module parts 19 may be sunk to the seabed 6 for assembly at the seabed 6 into the at least one of the modules 2. Alternatively or additionally, step S4 may be performed above sea surface, for instance on board a construction vessel, a platform or a nearby coast such as the coast 7. Step S4 may further be subdivided into constructional steps performed at various locations above and/or under water.

Preferably, the method further comprises the step S5 of mounting the anti-scour apron 24 on the seabed 6. As illustrated in FIG. 5, step S5 is preferably executed before step S1, irrespective of if or when step S4 is performed. However, this order is not restrictive. Other sequences may be envisaged, such as performing step S5 after step S1 with or without performing step S4. The anti-scour apron 24 may be mounted after some or all of the plurality of modules 2 has been sunk to the seabed 6 so that, for example, the anti-scour apron 24 is only mounted on part of the seabed 6 surrounding the underwater modular structure 1.

Preferably, the method further comprises the step S6 of seeding the underwater modular structure 1 with reef-forming species 31. The advantages of the reef-forming species 31 are described above and equally apply for the method according to the invention. Step S6 is preferably performed near or at the end of the method, as is also illustrated in FIG. 5. However, the sequence is not restrictive as, for example, step S6 may be performed straight after step S1 or even before S1. That is, the reef-forming species 31 may be seeded on the plurality of modules 2 before and/or after these are sunk to the seabed 6. Care should be taken to ensure survival of the seeded reef-forming species 31 whenever step S6 is included in the method. For example, it is preferred that step S3, if included in the method with or without S3A, is performed before S6 and waters are left to sufficiently clear before performing step S6.

The method may further include the step S7 of shaping the seabed 6. This may serve to enhance stability of the underwater modular structure 1, facilitate step S5, influence flow of water or may form part of step S3A. As illustrated in FIG. 5, step S7 is preferably performed before S5, though this order is not restrictive. Step S7 may be performed at any time within the method, for example after step S2 when step S7 may serve to embed the underwater modular structure 1 in the seabed 6 or to cover part of the underwater modular structure 1 with the sediment 18 and/or the seabed 6.

The order in which the steps are illustrated in FIG. 5 is not intended as restrictive. The steps S3, S3A, S4, S5, S6 and/or S7 may be left out according to circumstances, though steps S1 and S2 are preferred in all embodiments of the method according to the invention.

The method performed according to any combination of the above steps may comprise constructing an underwater modular structure 1 according to the invention. In this particular case, the steps S1 and S2 are essential.

FIG. 6 shows a schematic exploded view of an example of an underwater modular structure 1 according to the invention. This underwater modular structure 1 comprises four identical modules 2 and four connectors 3 arrangeable through connector insertion openings 11 of the modules 2. The connectors 3 are elongate members, here illustrated as a circular hollow tube, that fit through the connector insertion openings 11 in order to interlock the modules 1. A tight-fitting scheme may be used and/or fastening means such as bolts and nuts may be applied to further secure the coupling between the connectors 3 and the modules 2.

Further, a spacer 33 is illustrated arranged on two of the connectors 3. The spacer 33 may form a distinct type of module from the plurality of modules 2, or may be integrally formed with the connector 3. The spacer 33 here vertically spaces apart two modules 2 by a distance smaller than the dimensions of these modules 2. Spacers 33 thus further enhance to adaptability of the underwater modular structure 1. When the spacer 33 is a type of module from the plurality of modules 3, it preferably comprises connector insertion openings 11 to readily receive the connector 3 and/or inward or outward taper 11-1, 11-2 for coupling with further modules, which may be of a different type. The spacer 33 further prevents blocks from sliding and contributes to reaching a higher height of the underwater modular structure 1 with less modules 2 but with a similar wave breaking capability. In addition, it further defines the labyrinth 4, increases its complexity as spaces between modules 2 work as passages and cavities for dissipation of wave energy and/or different marine species to shelter.

As described above, the underwater modular structure 1 may be an assembly of the plurality of modules 2 and a connector 3 interconnecting these modules 2. It is however conceivable that a spacer 33 may provide an offset between two adjacent interconnected modules 2. Said spacer 33 may be a separate element having a through hole for guiding the connector 3 therethrough, or alternatively, the spacer 33 may be integrated with the connector 3.

Though the invention is described in the context of an underwater modular structure 1 near the coast 7, the nearness of said coast 7 is not required. For example, the invention may equally be employed in a preferably shallow sea distant from coasts. Alternatively or additionally, the underwater modular structure 1 may be positioned near a coastal or off-shore structure such as a sandbank, pier, platform, quay, lighthouse and wind turbine.

The invention thus provides an underwater modular structure 1 of configurable complexity. This complexity may be optimised for particular circumstances at the underwater construction site. The underwater modular structure 1 may thus be configured to promote a particular underwater ecological habitat 15 including target species. For example, growth of oysters may be promoted in colder waters while corals may be promoted in warmer waters. As a further example, the underwater modular structure 1 may provide areas accessible to sunlight and shadow areas, promoting corals and sponges, respectively, each contributing to the underwater ecological habitat 15.

Although preferred embodiments of the invention have been described above, these embodiments are intended only to illustrate the invention and not to limit in any way the scope of the invention. Accordingly, it should be understood that where features mentioned in the appended claims are followed by reference signs, such signs are included solely for the purpose of enhancing the intelligibility of the claims and are in no way limiting on the scope of the claims. Furthermore, it is particularly noted that the skilled person can combine technical measures of the different embodiments, such as the module parts 19 that define the inner wall 21 of at least one of the plurality of modules 2 wherein the inner wall 21 comprises the three-dimensional geometric complexity 26. The scope of the invention is therefore defined solely by the following claims.

The invention claimed is:

1. A module for an underwater modular structure comprising a plurality of mutually compatible modules wherein a labyrinth is at least in part defined by inner contours of the plurality of modules to force incoming water to pass through the labyrinth, wherein the module has an elongate form and comprises:
   connector insertion openings configured to receive a connector in the form of an elongate member therethrough, wherein:
   a connector insertion opening is arranged at each end of the module and equidistant along its sides;
   at least one of the connector insertion openings is inwardly tapered to define a guide for connector insertion into the module; and
   at least one of the connector insertion openings is outwardly protruding, wherein the inwardly tapered connector insertion opening and the outwardly protruding connector insertion opening are arranged on opposite sides of the module to mutually extend the guide defined by the inwardly protruding connector insertion opening to guide the connector out of the module; and
   a tortuous path in the form of tunnels further defining the labyrinth internal to the module comprising a plurality of interconnected inlets and outlets which comprise the connector insertion openings.

2. The module of claim 1, wherein the tortuous path is further configured to allow passage of underwater life into and out of the underwater modular structure and/or to offer shelter for underwater life.

3. The module of claim 1, comprising module parts that are configured for assembly into a module, wherein the module parts define at least one of:
   an outer wall of said module comprising the at least one connector insertion opening of the module; and
   an inner wall of said module, preferably defining the inner contour of the module.

4. The module of claim 3, wherein the module parts comprise slots configured for mutual engagement of the module parts.

5. The module of claim 1, comprising a three-dimensional geometric complexity that further defines the labyrinth, wherein the three-dimensional geometric complexity is preferably configured to stimulate development of an underwater ecological habitat.

6. The module of claim 5, wherein the three-dimensional geometric complexity comprises at least one of:
   a textured surface;
   a porous surface;
   the plurality of interconnected inlets and outlets; and
   a cavity.

7. An underwater modular structure, comprising:
   a plurality of mutually compatible modules according to claim 1; and
   a labyrinth defined by contours of at least the plurality of modules, the labyrinth being at least in part defined by inner contours of the plurality of modules,
   wherein the plurality of modules are interlocked by means of their respective inwardly tapered and outwardly protruding connector insertion openings and/or by at least one connector being an elongate member arranged through at least one connector insertion opening of each of the plurality of modules thereby interlocking the plurality of modules.

8. The underwater modular structure of claim 7, wherein the labyrinth is at least in part defined by outer contours of the plurality of modules.

9. The underwater modular structure of claim 7, wherein the at least one connector is a hollow member further defining the labyrinth.

10. The underwater modular structure of claim 7, wherein the labyrinth is at least partly defined by outer contours and/or inner contours of the at least one connector.

11. The underwater modular structure of claim 7, wherein the underwater modular structure, preferably at least one of the plurality of modules, further comprises at least one chamber that is at least partly filled with a filler, wherein the filler is a sediment.

12. The underwater modular structure of claim 7, seeded with reef-forming species to promote development of an underwater ecological habitat.

13. A method of constructing an underwater modular structure, the method comprising:

sinking a plurality of modules according to claim 1 to a seabed, wherein each module comprises at least one connector insertion opening; and interlocking the plurality of modules with at least one connector that is an elongate hollow member, by arranging the at least one connector through at least one connector insertion opening of each of the plurality of modules, passing from a first module through a second module into a third module of the plurality of modules, to form a labyrinth defined by contours of at least the plurality of modules and the at least one connector.

14. The method of claim 13, further comprising at least one of the steps of:

filling at least part of the underwater modular structure with a filler, preferably by pumping a local sediment from the seabed into the underwater modular structure;

assembling at least one of the modules from module parts;

mounting an anti-scour apron on the seabed;

seeding the underwater modular structure with reef-forming species.

15. The method of claim 13, comprising constructing an underwater modular structure comprising:

a plurality of mutually compatible modules; and a labyrinth defined by contours of at least the plurality of modules, the labyrinth being at least in part defined by inner contours of the plurality of modules, wherein the plurality of modules are interlocked by means of their respective inwardly tapered and outwardly protruding connector insertion openings and/or by at least one connector being an elongate member arranged through at least one connector insertion opening of each of the plurality of modules thereby interlocking the plurality of modules; and a tortuous path in the form of tunnels further defining the labyrinth internal to the module comprising a plurality of interconnected inlets and outlets which comprise the connector insertion openings.

* * * * *